Patented Nov. 24, 1925.

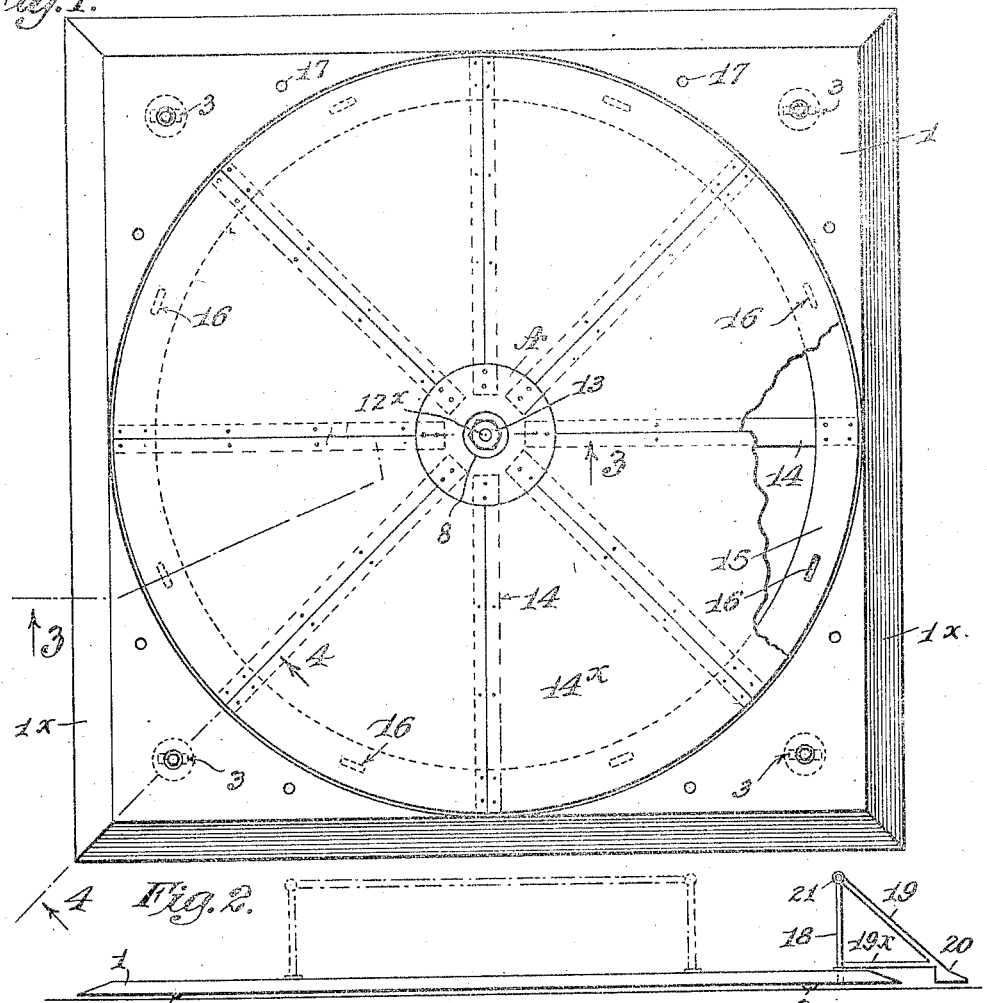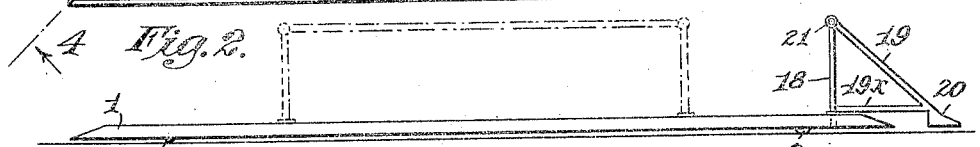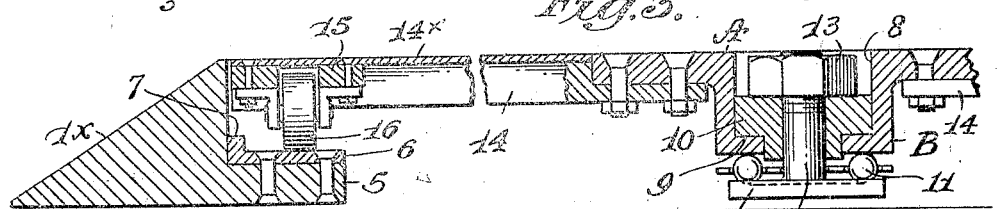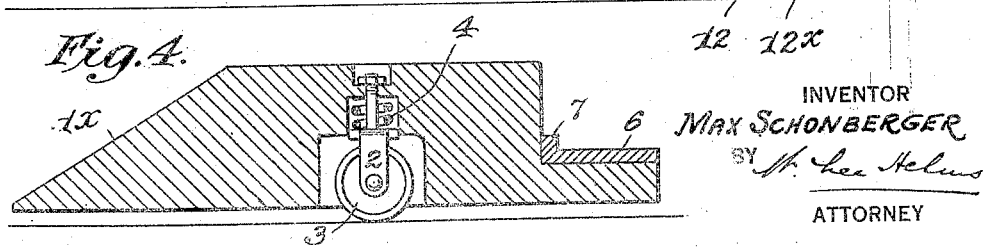

1,562,853

UNITED STATES PATENT OFFICE.

MAX SCHONBERGER, OF BROOKLYN, NEW YORK.

PORTABLE AUTOMOBILE TURNTABLE FOR GARAGES.

Application filed June 18, 1925. Serial No. 37,885.

*To all whom it may concern:*

Be it known that I, MAX SCHONBERGER, a citizen of the United States of America, residing in Brooklyn, county of Kings, and State of New York, have invented certain new and useful Improvements in Portable Automobile Turntables for Garages, of which the following is a specification.

The object of the present invention is to provide a turntable which shall be light in construction, operable by one man and, notwithstanding its lightness, sufficiently strong to support the heaviest automobile without distortion or breakage of the parts.

The invention will be understood by reference to the accompanying drawings in which—

Figure 1 is a plan view of an embodiment of the invention, the covering plates for the turntable being partially broken away;

Figure 2 is a side elevation of the device showing in dotted lines the form of the bumper in elevation;

Figure 3 is a transverse section on the line 3—3, Figure 1, and

Figure 4 is a partial section on the line 4—4, Figure 1.

Referring to the drawings, 1 represents a rectangular or other shaped frame which may be of wood, metal or the two combined. It is shaped with the inwardly inclined faces 1˟ and is intended to afford a trackway and support for the rotating table A.

Frame 1 is normally freely movable on the floor of the garage so as to be readily brought into the desired position. To this end it is provided with castor-supports 2, provided with rollers or castors 3. The said castor-supports are spring pressed by means of the springs 4 and the total spring resistance of springs 4 is appreciably above the weight of the turntable as a whole and yet such resistance is less than the weight of the lightest automobile for which the device is designed to handle. In other words, the springs 4 will serve to normally maintain the bottom wall of the turntable above the garage floor so that the rollers 3 will be effective at all times except when an automobile is placed upon the turntable, at which time the entire turntable will settle down upon the floor and the frame 1 will be adequately supported by the floor. Means are provided for relieving the frame 1 of a large proportion of the stresses imposed upon the device by the automobile it supports, and such means will be hereinafter described in detail.

Frame 1 is provided with a circular inwardly projecting flange 5 and upon this flange is preferably secured a metal trackway 6 having an upwardly extending guard flange 7, the whole affording an adequate track-way for the wheeled margin of the turntable A.

The turntable is constructed with a heavy central hub B having a central socket 8 below which is a shoulder 9, the socket being formed with a central aperture to receive an apertured plug 10. Hub B rotates upon the bearings 11, the bearings being held in position by the large flat head 12 of a bolt 12˟ upon which is a nut 13 serving to hold the bolt in position. The bolt 12, 12˟ affords a central bearing member for the turntable, as will hereinafter be pointed out.

Hub B has secured thereto a number of radial arms 14 connecting with a ring 15 at the margin of the turntable, which ring has secured thereto a suitable number of wheels 16 bearing upon track-way 6. Arms 14 support covering plates 14˟, two or more covering plates being employed.

Frame 1 at each side is provided with two spaced apertures 17 adapted to receive posts 18 of a bumper comprising the posts, the projections 19, 19˟, and the feet 20. When the device is used the automobile is driven thereon until its front or rear wheels, as the case may be, strike the cross bar 20 when further movement thereof will be resisted by the bumper, the projections 19, 19˟ and feet 20, throwing the major strain upon the floor of the garage rather than upon the turntable.

It is intended that the device be principally used in the aisles of garages. When a car is to be placed in its space transversely of the aisle, the turntable is wheeled directly in front of the space to receive the car and the car is driven down the aisle and upon the turntable. Immediately the weight of the car is received by the turntable, the device settles down upon the floor and, through bearing members 11 and the head of bolt 12 a large proportion of the weight of the car may be supported centrally of the turntable and the frame thereby relieved. The operator may then freely swing the turntable so as to place the car in transverse position relatively to the aisle.

Having described my invention what I claim and desire to secure by Letters Patent is as follows:

1. A portable automobile turntable for garages, comprising a frame, a turntable revolubly mounted to rotate on said frame and rotary supporting members for the frame in combination with spring resistance members adapted to normally project said rotary supporting members below the frame, the said resistance members being adapted to be overcome by the weight of an automobile upon the turntable.

2. A portable automobile turntable for garages, comprising a frame, a turntable revolubly mounted to rotate on said frame, rotary supporting members for the frame in combination with spring resistance members adapted to normally project said rotary supporting members below the frame, but the said resistance members adapted to be overcome by the weight of an automobile, and a supporting hub for the turntable normally held raised above the garage floor by said rotary supporting members, and adapted to rest upon the floor when the turntable is in operation.

3. A portable automobile turntable for garages, comprising a frame, spring pressed wheels adapted to normally support said frame above the garage floor, an annular track-way carried by the frame, a hub, arms extending radially of said hub, a ring connecting the outer ends of the arms, wheels carried by said arms through the intermediary of the ring, plates covering the arms, and a bearing member for the hub, said bearing member being normally supported by the latter and the bearing member and frame adapted to settle upon the floor when an automobile is placed upon the turntable.

4. A device constructed in accordance with claim 2 in combination with an automobile bumper comprising posts adapted to fit into sockets formed in the frame, a cross arm connecting the posts, downwardly inclined projections carried by the posts and extending beyond the frame and feet carried by said projections and adapted to rest upon the garage floor.

In testimony whereof, I have signed my name to this specification.

MAX SCHONBERGER.